(12) United States Patent
Nakamura et al.

(10) Patent No.: US 11,796,626 B2
(45) Date of Patent: Oct. 24, 2023

(54) POSITIONING DEVICE, POSITIONING SYSTEM, MOBILE TERMINAL, AND POSITIONING METHOD

(71) Applicant: MITSUBISHI ELECTRIC CORPORATION, Tokyo (JP)

(72) Inventors: Masanari Nakamura, Tokyo (JP); Tetsutaro Yamada, Tokyo (JP); Hiroshi Kameda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 177 days.

(21) Appl. No.: 17/368,320

(22) Filed: Jul. 6, 2021

(65) Prior Publication Data
US 2021/0333354 A1   Oct. 28, 2021

Related U.S. Application Data

(63) Continuation of application No. PCT/JP2019/005527, filed on Feb. 15, 2019.

(51) Int. Cl.
  *G01S 3/02* (2006.01)
  *G01S 5/14* (2006.01)
  (Continued)

(52) U.S. Cl.
  CPC ............ *G01S 5/02216* (2020.05); *G01S 5/14* (2013.01); *G01S 5/18* (2013.01); *G01S 2205/02* (2020.05)

(58) Field of Classification Search
  CPC .......... G01S 3/02; G01S 5/02216; G01S 5/14; G01S 5/18
  (Continued)

(56) References Cited

U.S. PATENT DOCUMENTS 10,365,363 B2 * 7/2019 Rohr ...................... G01C 21/12
2016/0109558 A1    4/2016 Sugita et al.

FOREIGN PATENT DOCUMENTS

WO    WO 2014/192893 A    12/2014

OTHER PUBLICATIONS

Xu et al., "Whistle: Synchronization-Free TDOA for Localization," 2011 31st International Conference on Distributed Computing Systems, IEEE, Minneapolis, MN, 2011, pp. 760-769.
(Continued)

*Primary Examiner* — Harry K Liu
(74) *Attorney, Agent, or Firm* — Birch, Stewart, Kolasch & Birch, LLP

(57) ABSTRACT

A positioning device operates in cooperation with a signal receiver for receiving a plurality of signal waves arriving from at least one synchronous transmission unit including a plurality of signal transmitters that operates in synchronization with each other. The positioning device includes: a time-of-arrival detecting unit for detecting time of arrival of each of the plurality of signal waves on the basis of a reception signal output from the signal receiver and a distance difference calculating unit for calculating a difference in distance from the plurality of signal transmitters to the signal receiver as a set of observation values on the basis of a difference in the time of arrival that has been detected; and a positioning arithmetic unit. The positioning arithmetic unit calculates a time series of an estimation state vector indicating position information of the signal receiver by executing a positioning arithmetic operation based on a nonlinear Kalman filter using a time series of an observation vector indicating the set of the observation values and known position information of the plurality of signal transmitters.

11 Claims, 9 Drawing Sheets

(51) Int. Cl.
*G01S 5/02* (2010.01)
*G01S 5/18* (2006.01)

(58) Field of Classification Search
USPC .......................................................... 342/458
See application file for complete search history.

(56) References Cited

OTHER PUBLICATIONS

Lazik et al., "Indoor Pseudo-ranging of Mobile Devices using Ultrasonic Chirps," In Proceedings of the 10th ACM Conference on Embedded Network Sensor Systems (SenSys '12), ACM, Toronto, ON, Canada, Nov. 6-9, 2012, pp. 99-112.

* cited by examiner

POSITIONING DEVICE, POSITIONING SYSTEM, MOBILE TERMINAL, AND POSITIONING METHOD

CROSS REFERENCE TO RELATED APPLICATION

This application is a Continuation of PCT International Application No. PCT/JP2019/005527, filed on Feb. 15, 2019, which is hereby expressly incorporated by reference into the present application.

TECHNICAL FIELD

The present invention relates to positioning technology for measuring position information using signal waves transmitted from a plurality of signal transmission sources.

BACKGROUND ART

The global navigation satellite system (GNSS) is a general term for satellite positioning systems such as the global positioning system (GPS), the Galileo, and the Quasi-Zenith Satellite System (QZSS). Using a global navigation satellite system (hereinafter referred to as "GNSS") makes it possible to measure position information on the basis of radio signals received from a plurality of positioning satellites on the Earth's satellite orbits. In order to perform positioning in an environment where it is difficult to receive radio signals from positioning satellites (for example, indoor space and underground space), positioning technology that replaces the GNSSs is necessary.

As positioning technology other than the GNSSs, positioning technology using a plurality of access points in a wireless local area network (LAN) or a plurality of signal sources such as a plurality of beacons each for transmitting radio waves or non-audible sounds is known. Here, the positions of the plurality of signal sources are used as known information. For example, a positioning system based on the Time of Arrival (ToA) method is to measure distances between a reception terminal and a plurality of signal sources on the basis of measured values of the time of arrival of signal waves propagated from the plurality of signal sources to the reception terminal and to estimate position information of the reception terminal on the basis of the distances that have been measured. However, since high-precision time synchronization among the reception terminal and the plurality of signal sources is required in order to obtain high positioning accuracy, there is a disadvantage that the cost of the positioning system is increased.

To address such a disadvantage, Patent Literature 1 (International Publication No. 2014-192893) discloses a positioning system that does not require time synchronization among a reception terminal and a plurality of signal sources. The positioning system disclosed in Patent Literature 1 includes a portable terminal (reception terminal) carried by a user, a plurality of beacons (signal sources) for transmitting non-audible sounds to the portable terminal while being arranged in an indoor space, a fixed receiver disposed in the indoor space, and a server capable of communicating with the fixed receiver and the portable terminal via a communication network. According to this positioning system, the portable terminal acquires a receiver ID of the fixed receiver that is in the proximity thereof and acquires, from the server, auxiliary information regarding transmission timing of the non-audible sounds from each of the plurality of beacons by transmitting the receiver ID to the server. Next, the portable terminal receives the non-audible sounds from the plurality of beacons and calculates an error $\Delta$ between a timer of the portable terminal and the timer of the fixed receiver on the basis of the non-audible sounds and the auxiliary information. Then, the portable terminal receives the non-audible sounds from the plurality of beacons again and can measure position information of the portable terminal using the reception time of the non-audible sounds and the error $\Delta$.

CITATION LIST

Patent Literature

Patent Literature 1: International Publication No. 2014-192893 (see, for example, FIGS. 1, 4, and 5 and paragraphs [0043] to [0048], [0050] to [0053], and

SUMMARY OF INVENTION

Technical Problem

However, in the positioning system disclosed in Patent Literature 1, there is a disadvantage that the configuration cost of the positioning system increases since it is necessary to install the fixed receiver for transmitting a receiver ID to the portable terminal in an indoor space in advance and to prepare the server for providing auxiliary information to the portable terminal in the indoor space in advance. Furthermore, in a communication environment in which no auxiliary information can be received from the server, it is difficult to measure the position information of the portable terminal with high accuracy.

In view of the above, an object of the present invention is to provide a positioning device, a positioning system, a mobile terminal, and a positioning method which can suppress the configuration cost of the positioning system and are capable of measuring highly accurate position information even in an environment where no GNSSs can be used.

Solution to Problem

A positioning device according to one aspect of the present invention is a positioning device for operating in cooperation with a signal receiver for receiving a plurality of signal waves arriving from at least one synchronous transmitter including a plurality of signal transmitters that operates in synchronization with each other, the positioning device including: processing circuitry configured to detect time of arrival of each of the plurality of signal waves on the basis of a reception signal output from the signal receiver; calculate a difference in distance from the plurality of signal transmitters to the signal receiver as a set of observation values on the basis of a difference in the time of arrival that has been detected; and calculate an estimation state vector indicating position information of the signal receiver by executing a positioning arithmetic operation based on a nonlinear Kalman filter using an observation vector indicating the set of the observation values and known position information of the plurality of signal transmitters.

Advantageous Effects of Invention

According to one aspect of the present invention, it is possible to measure highly accurate position information even in an environment where no GNSSs can be used and to suppress the configuration cost of the positioning system.

DESCRIPTION OF EMBODIMENTS

Hereinafter, various embodiments of the present invention will be described in detail with reference to the drawings. Note that components denoted by the same symbol throughout the drawings have the same configuration and the same function.

First Embodiment

Figure 1:
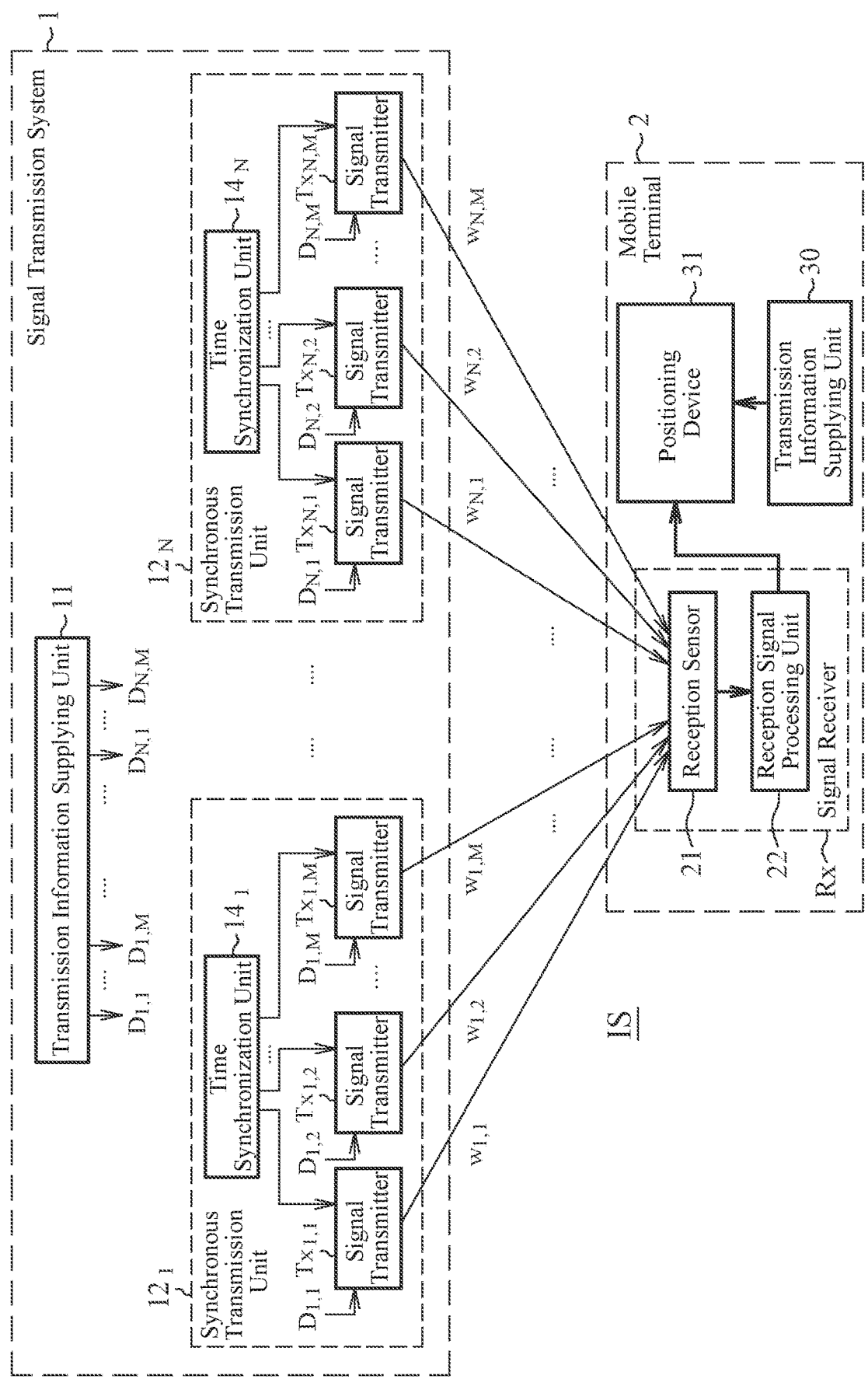
FIG. 1 is a functional block diagram illustrating a schematic configuration of a positioning system according to a first embodiment of the present invention.

FIG. 1 is a functional block diagram illustrating a schematic configuration of a positioning system according to a first embodiment of the present invention. The positioning system illustrated in FIG. 1 includes a signal transmission system 1 and a mobile terminal 2. The signal transmission system 1 is disposed in a positioning space IS such as an indoor space or an underground space where positioning using a GNSS cannot be performed. The signal transmission system 1 can measure position information of the mobile terminal 2 with high accuracy even in such a positioning space IS.

The signal transmission system 1 includes N synchronous transmission units $12_1, \ldots, 12_N$ for transmitting a plurality of signal waves for positioning and a transmission information supplying unit 11 for supplying transmission information necessary for transmission of the plurality of signal waves to the synchronous transmission units $12_1, \ldots, 12_N$. Here, N is an integer greater than or equal to 2. It is based on the premise that the synchronous transmission units $12_1, \ldots, 12_N$ all have the same configuration.

An n-th synchronous transmission unit $12_n$ includes M signal transmitters $Tx_{n,1}, Tx_{n,2}, \ldots, Tx_{n,M}$ and a time synchronization unit $14_n$ for causing the M signal transmitters $Tx_{n,1}, Tx_{n,2}, \ldots, Tx_{n,M}$ to operate in synchronization with each other. Here, n is an integer in a range of 1 to N indicating the number of the synchronous transmission unit $12_n$, and M is an integer greater than or equal to 3 indicating the number of the signal transmitters $Tx_{n,1}$ to $Tx_{n,M}$. The transmission information supplying unit 11 supplies control signals $D_{n,1}, \ldots, D_{n,M}$ for specifying a waveform pattern of a signal wave to be transmitted from the signal transmitters $Tx_{n,1}, Tx_{n,2}, \ldots, Tx_{n,M}$, respectively, to the signal transmitters $Tx_{n,1}, Tx_{n,2}, \ldots, Tx_{n,M}$, respectively. The signal transmitters $Tx_{n,1}, Tx_{n,2}, \ldots, Tx_{n,M}$ operate in synchronization with each other and are capable of transmitting signal waves $w_{n,1}, w_{n,2}, \ldots, w_{n,M}$ (for example, radio waves or sound waves in a non-audible range) having waveform patterns specified by the control signals $D_{n,1}, \ldots, D_{n,M}$ at transmission timing specified by the synchronous transmission unit $12_n$.

In the present embodiment, the time synchronization unit $14_n$ implements time synchronization among the signal transmitters $Tx_{n,1}, Tx_{n,2}, \ldots, Tx_{n,M}$. Meanwhile, time synchronization among the synchronous transmission units $12_1, \ldots, 12_N$ is not always necessary.

Such a synchronous transmission unit $12_n$ can be used by being incorporated into an audio output device such as a stereo music player.

Figure 2:
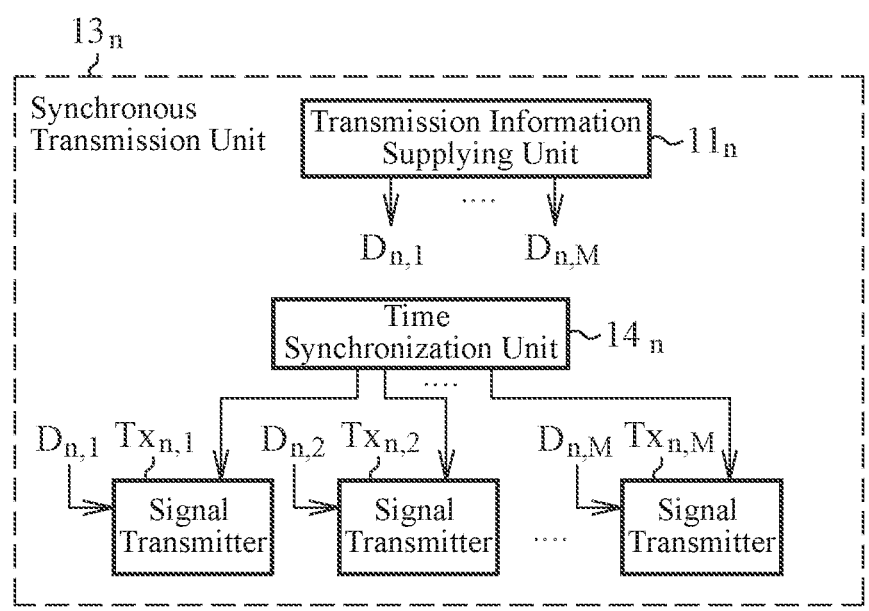
FIG. 2 is a functional block diagram illustrating a schematic configuration of a synchronous transmission unit according to a modification of the first embodiment.

Note that the transmission information supplying unit 11 of the present embodiment is a component separate from the synchronous transmission units $12_1, \ldots, 12_N$, however, it is not limited thereto. FIG. 2 is a functional block diagram illustrating a schematic configuration of a synchronous transmission unit $13_n$ according to a modification of the first embodiment. The synchronous transmission unit $13_n$ includes signal transmitters $Tx_{n,1}, Tx_{n,2}, \ldots, Tx_{n,M}$ and a transmission information supplying unit $11_n$ for supplying control signals $D_{n,1}, \ldots, D_{n,M}$ for specifying a waveform pattern to the signal transmitters $Tx_{n,1}, Tx_{n,2}, \ldots, Tx_{n,M}$, respectively. Instead of the synchronous transmission units $12_n$ illustrated in FIG. 1, the synchronous transmission units $13_n$ illustrated in FIG. 2 may be used.

Next, with reference to FIG. 1, the mobile terminal 2 includes a signal receiver Rx for receiving signal waves $w_{1,1}$ to $w_{1,M}, \ldots, w_{N,1}$ to $w_{N,M}$ arriving from the synchronous transmission units $12_1, \ldots, 12_N$ in the signal transmission system 1, a positioning device 31 that operates in cooperation with the signal receiver Rx, and a transmission information supplying unit 30. The transmission information supplying unit 30 supplies the positioning device 31 with known position information of the synchronous transmission units $12_1, \ldots, 12_N$ and a reference signal to be used for detection of time of arrival. As the mobile terminal 2, for example, a mobile communication terminal such as a smartphone or a digital communication device such as a tablet terminal can be used.

Note that the transmission information supplying unit 30 of the present embodiment is a component separate from the positioning device 31, however, it is not limited thereto. The transmission information supplying unit 30 may be incorporated in the positioning device 31.

The signal receiver Rx includes a reception sensor 21 for detecting the signal waves $w_{1,1}$ to $w_{1,M}, \ldots, w_{N,1}$ to $w_{N,M}$ arriving from the synchronous transmission units $12_1, \ldots, 12_N$, and a reception signal processing unit 22 for generating a digital reception signal by performing analog signal processing such as amplification and analog-to-digital conversion on an analog reception signal output from the reception sensor 21. In a case where sound waves in a non-audible range are output from the synchronous transmission units $12_1, \ldots, 12_N$, the reception sensor 21 of the signal receiver Rx is only required to be composed of, for example, a microphone having sensitivity in the non-audible range. The digital reception signal (hereinafter, simply referred to as "reception signal") output from the reception signal processing unit 22 is given to the positioning device 31.

Figure 3:
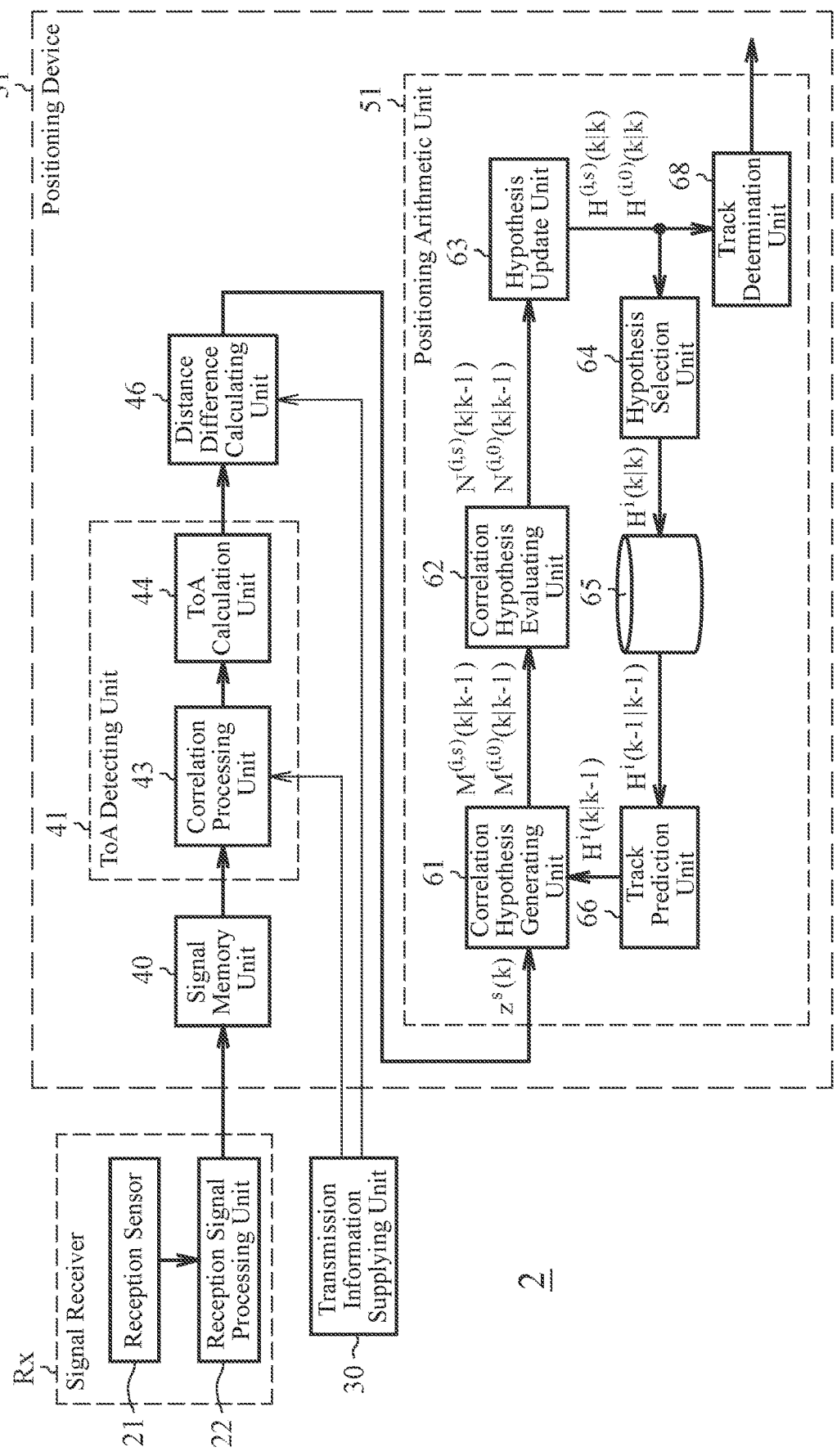
FIG. 3 is a functional block diagram illustrating a schematic configuration of a positioning device according to the first embodiment.

Next, the configuration of the positioning device 31 will be described with reference to FIG. 3. FIG. 3 is a functional block diagram illustrating a schematic configuration of the positioning device 31 according to the first embodiment.

As illustrated in FIG. 3, the positioning device 31 includes a signal memory unit 40 for temporarily storing a reception signal output from the signal receiver Rx, a time of arrival (ToA) detecting unit 41 for detecting the time of arrival of each of a plurality of signal waves arriving from the signal transmitters $Tx_{n, 1}$ to $Tx_{n, M}$ for each synchronous transmission unit $12_n$ on the basis of the reception signal read from the signal memory unit 40, a distance difference calculating unit 46 for calculating the differences in distance from the signal transmitters $Tx_{n, 1}$ to $Tx_{n, M}$ to the signal receiver Rx as a set of observation values for each synchronous transmission unit $12_n$ on the basis of differences in the time of arrival that has been detected, and a positioning arithmetic unit (tracking processing unit) 51. The positioning arithmetic unit 51 has a function of calculating an estimation state vector indicating position information, that is, a track, of the signal receiver Rx, which is the target, by executing a positioning arithmetic operation based on a nonlinear Kalman filter using an observation vector indicating the set of observation values calculated by the distance difference calculating unit 46 and known position information of the signal transmitters $Tx_{n, 1}$ to $Tx_{n, M}$. The positioning arithmetic unit 51 can track the track that changes from moment to moment.

The ToA detecting unit 41 includes a correlation processing unit 43 and a ToA calculating unit 44. The correlation processing unit 43 executes a correlation process between the reference signal supplied from the transmission information supplying unit 30 and the reception signal. Such a correlation processing unit 43 may be configured by using, for example, a matched filter of known technology. In an output signal waveform of the correlation processing unit 43, a plurality of peaks appears which corresponds to the time of arrival of respective signal waves arriving from the signal transmitters $Tx_{n, 1}$ to $Tx_{n, M}$. The ToA calculating unit 44 can detect these peaks and calculate the time of arrival that corresponds to each of the peaks that have been detected. For example, the ToA calculating unit 44 can detect those peaks by comparing the amplitude or the power of an output signal of the correlation processing unit 43 with a threshold value TH.

The distance difference calculating unit 46 acquires the time of arrival detected by the ToA detecting unit 41 and is capable of calculating a difference in distance from the signal transmitters $Tx_{n, 1}$ to $Tx_{n, M}$ to the signal receiver Rx (hereinafter referred to as "distance difference") for each synchronous transmission unit $12_n$ on the basis of a difference in the time of arrival (hereinafter referred to as "time of arrival difference").

Here, let $(x_A, y_A, z_A)$, $(x_B, y_B, z_B)$, $(x_C, y_C, z_C)$, and $(x_D, y_D, z_D)$ be position coordinates of four signal transmitters $Tx_{n, A}$, $Tx_{n, B}$, $Tx_{n, C}$, and $Tx_{n, D}$, respectively, out of the signal transmitters $Tx_{n, 1}$ to $Tx_{n, M}$ present in the positioning space IS (three-dimensional space), and let $(x, y, z)$ be the position coordinates of the signal receiver Rx. Let $r_A$, $r_B$, $r_C$, and $r_D$ be the distance between the four signal transmitters $Tx_{n, A}$, $Tx_{n, B}$, $Tx_{n, C}$, and $Tx_{n, D}$ and the signal receiver Rx, respectively. Here, the distances $r_A$, $r_B$, $r_C$, and $r_D$ are expressed by the following Equations 1.1, 1.2, 1.3, and 1.4, respectively.

$$r_A = \sqrt{(x-x_A)^2 + (y-y_A)^2 + (z-z_C)^2} \quad (1.1)$$

$$r_B = \sqrt{(x-x_B)^2 + (y-y_B)^2 + (z-z_B)^2} \quad (1.2)$$

$$r_C = \sqrt{(x-x_C)^2 + (y-y_C)^2 + (z-z_C)^2} \quad (1.3)$$

$$r_D = \sqrt{(x-x_D)^2 + (y-y_D)^2 + (z-z_D)^2} \quad (1.1)$$

Let c be the propagation velocity of a signal wave in the positioning space IS, and among the four signal transmitters $Tx_{n, A}$, $Tx_{n, B}$, $Tx_{n, C}$, $Tx_{n, D}$, let $\delta_{AB}$ be the time of arrival difference of signal waves between the signal transmitters $Tx_{n, A}$ and $Tx_{n, B}$, let $\delta_{AC}$ be the time of arrival difference of signal waves between the signal transmitters $Tx_{n, A}$ and $Tx_{n, C}$, and let $\delta_{AD}$ be the time of arrival difference of signal waves between the signal transmitters $Tx_{n, A}$ and $Tx_{n, D}$. Here, a three-dimensional observation vector z, having distance differences $z_{AB}$, $z_{AC}$, and $z_{AD}$ as elements, expressed in the following Equations 2 can be obtained.

$$z = \begin{bmatrix} c \times \delta_{AB} \\ c \times \delta_{AC} \\ c \times \delta_{AD} \end{bmatrix} = \begin{bmatrix} z_{AB} \\ z_{AC} \\ z_{AD} \end{bmatrix} = \begin{bmatrix} |r_A - r_B| \\ |r_A - r_C| \\ |r_A - r_D| \end{bmatrix} \quad (2)$$

The distance difference calculating unit 46 can calculate, for example, a three-dimensional observation vector $z^s$ (k) at the time $t_k$ on the basis of Equations 2. Here, the superscript s represents the number of each observation vector obtained by one time of transmission of the synchronous transmission units $12_1, \ldots, 12_N$.

The positioning arithmetic unit 51 can measure the position information of the signal receiver Rx by executing a positioning arithmetic operation based on a nonlinear Kalman filter using the observation vector $z^s$ (k). As illustrated in FIG. 3, the positioning arithmetic unit 51 includes a correlation hypothesis generating unit 61, a correlation hypothesis evaluating unit 62, a hypothesis update unit 63, a hypothesis selection unit 64, a hypothesis storage unit 65, a track prediction unit 66, and a track determination unit 68. The configuration and the operation of the positioning arithmetic unit 51 will be described later.

All or some of the functions of the positioning device 31 described above may be implemented by a single or a plurality of processors including a semiconductor integrated circuit such as a digital signal processor (DSP), an application specific integrated circuit (ASIC), or a field-programmable gate array (FPGA). Alternatively, all or some of the functions of the positioning device 31 may be implemented by a single or a plurality of processors including an arithmetic device such as a central processing unit (CPU) or a graphics processing unit (GPU) for executing program codes of software or firmware. Further alternatively, all or some of the functions of the positioning device 31 can be implemented by a single or a plurality of processors including a combination of a semiconductor integrated circuit such as a DSP, an ASIC, or an FPGA and an arithmetic device such as a CPU or a GPU.

Figure 4:
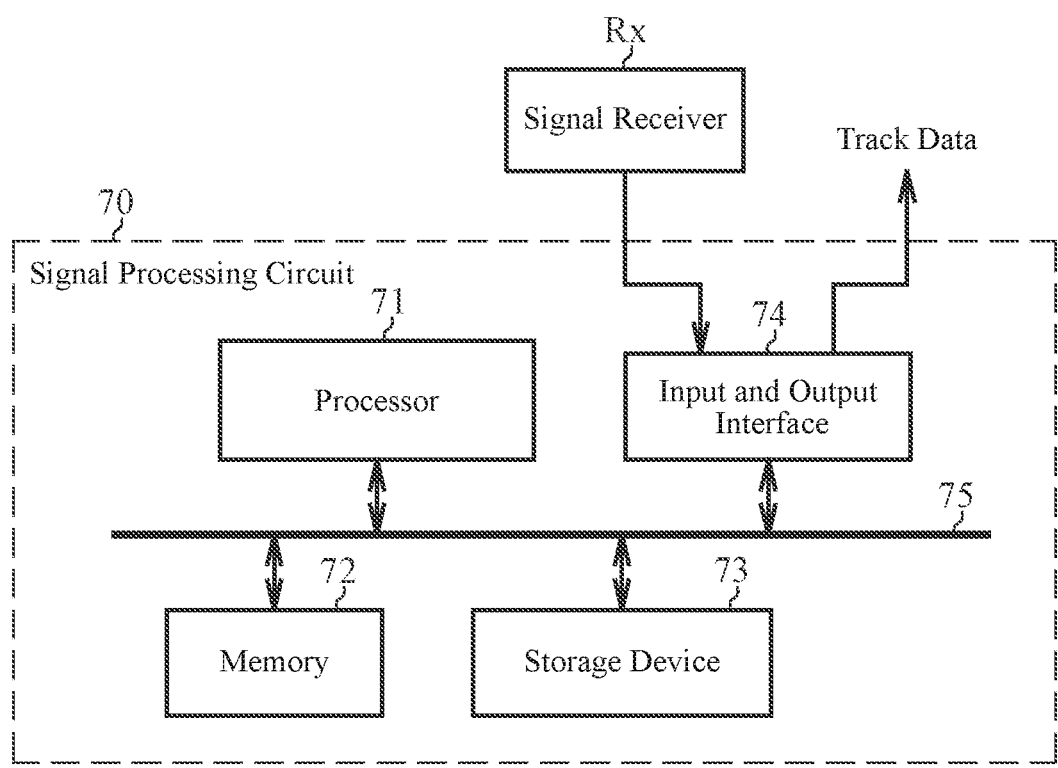
FIG. 4 is a functional block diagram illustrating a schematic configuration of a hardware configuration example of the positioning device according to the first embodiment.

FIG. 4 is a functional block diagram illustrating a schematic configuration of the signal processing circuit 70, which is an example of the hardware configuration of the positioning device 31 according to the first embodiment. The signal processing circuit 70 illustrated in FIG. 4 includes a processor 71, an input and output interface 74, a memory 72, a storage device 73, and a signal path 75. The signal path 75 is a bus for connecting the processor 71, the input and output interface 74, the memory 72, and the storage device 73 to each other. The input and output interface 74 has the function of transferring a signal input from the signal receiver Rx to the processor 71 as well as the function of outputting track data transferred from the processor 71 to the outside.

The memory 72 includes a work memory used when the processor 71 executes digital signal processing and a temporary storage memory in which data used in the digital signal processing is loaded. For example, the memory 72 is only required to include a semiconductor memory such as a flash memory and an SDRAM. The memory 72 can be used as the signal memory unit 40 and the hypothesis storage unit 65 in FIG. 3. Meanwhile, in a case where the processor 71 includes an arithmetic device such as a CPU or a GPU, the storage device 73 can be used as a storage area for storing program codes of software or firmware to be executed by the arithmetic device. For example, the storage device 73 is only required to include a non-volatile semiconductor memory such as a flash memory or a read only memory (ROM).

Note that although the number of processors 71 is one in the example of FIG. 4, the number of processors 71 is not limited thereto. The hardware configuration of the positioning device 31 may be implemented by using a plurality of processors that operate in cooperation with each other.

Figure 5:
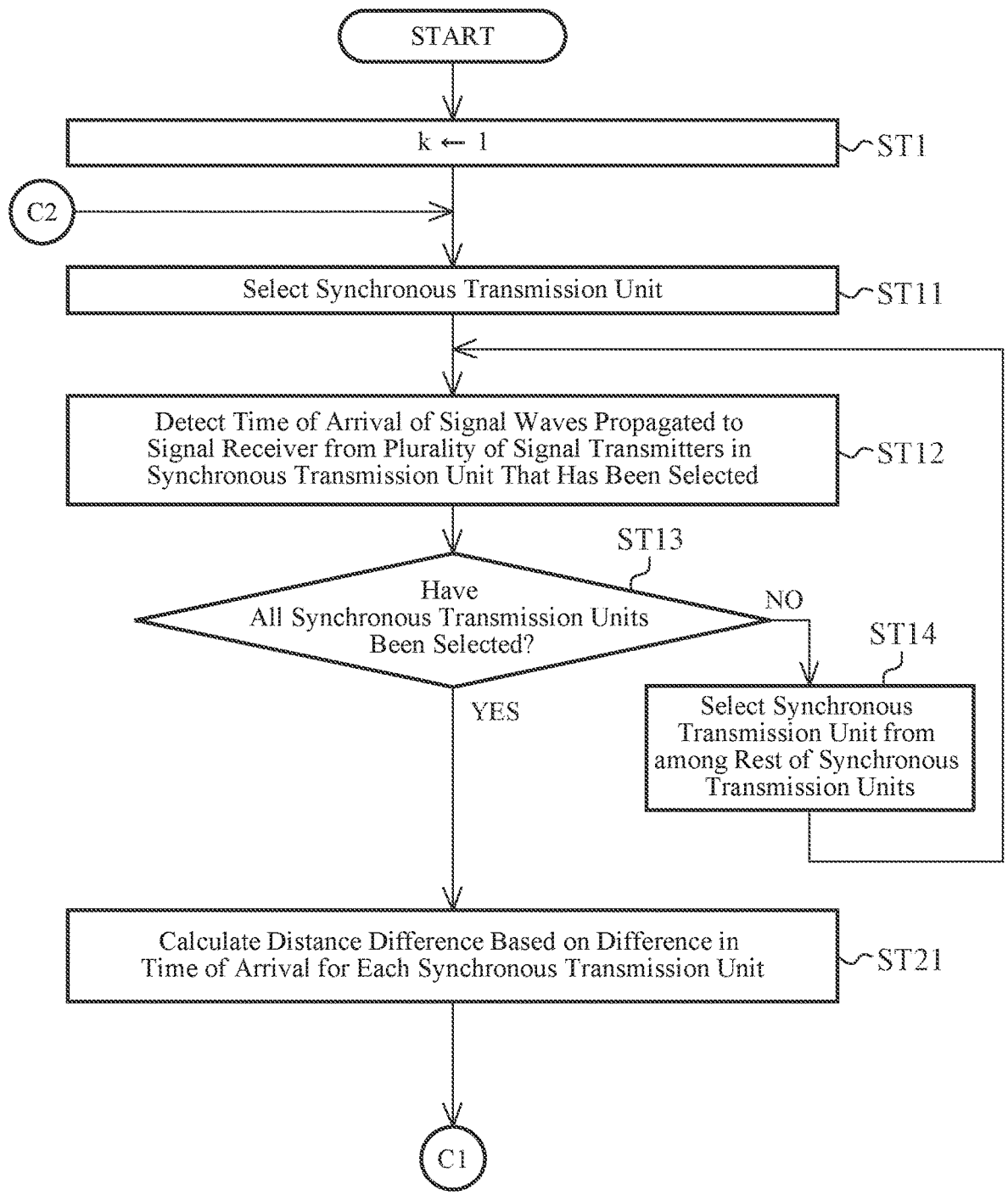
FIG. 5 is a flowchart schematically illustrating an exemplary procedure of positioning processing according to the first embodiment.
Figure 6:
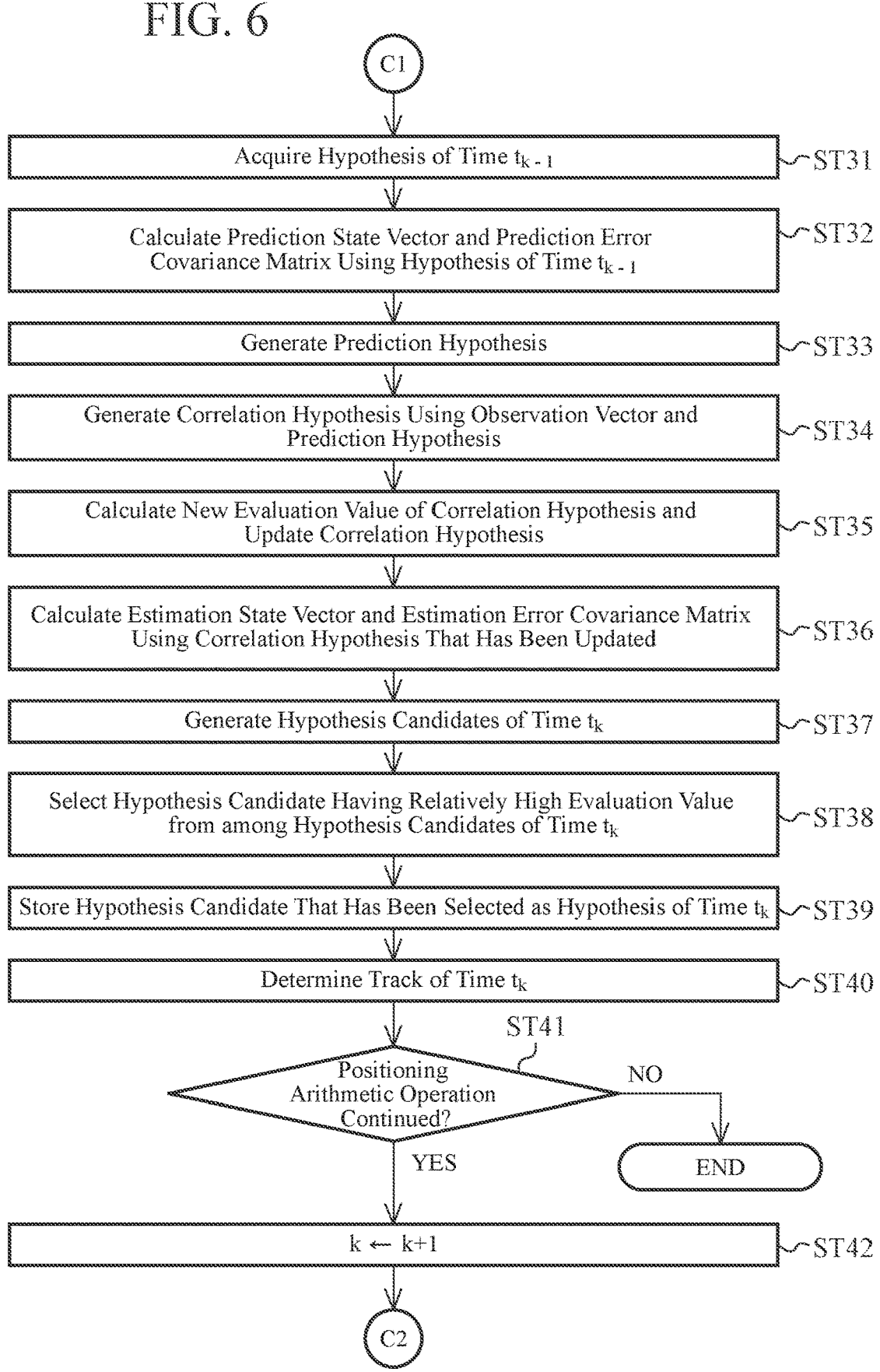
FIG. 6 is a flowchart schematically illustrating an exemplary procedure of positioning processing according to the first embodiment.

Next, the configuration and the operation of the positioning device 31 described above will be described with reference to FIGS. 5 and 6. FIGS. 5 and 6 are flowcharts each schematically illustrating an exemplary procedure of positioning processing according to the first embodiment. The flowcharts illustrated in FIGS. 5 and 6 are connected to each other via connectors C1 and C2.

First, in the positioning device 31, the number k that represents the current time $t_k$ is set to 1 (step ST1). Next, the ToA detecting unit 41 selects one synchronous transmission unit $12_n$ from the synchronous transmission units $12_1, \ldots, 12_N$ (step ST11) and detects time of arrival of signal waves $w_{n,1}$ to $w_{n,M}$ propagated to the signal receiver Rx from signal transmitters $Tx_{n,1}$ to $Tx_{n,M}$ in the synchronous transmission unit $12_n$, respectively (step ST12).

Figure 7A:
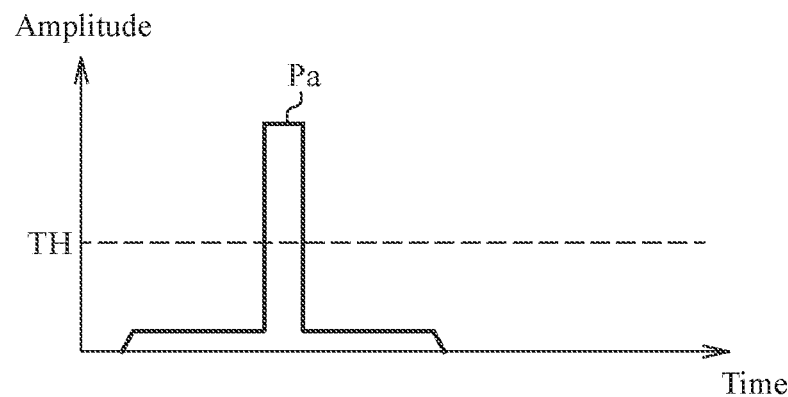
FIGS. 7A and 7B are schematic diagrams each illustrating an example of a waveform of an output signal of a correlation processing unit of the first embodiment.

Specifically, as described above, the correlation processing unit 43 executes the correlation process between the reference signal supplied from the transmission information supplying unit 30 and the reception signal read from the signal memory unit 40. The ToA calculating unit 44 detects peaks appearing in the output signal by comparing the amplitude or the power of the output signal of the correlation processing unit 43 with the threshold value TH and can calculate the time of arrival corresponding to each of the peaks that have been detected. In a case where there is no interference among the signal waves, an output signal waveform Pa of the correlation processing unit 43 is not distorted as illustrated in the example of FIG. 7A. Therefore, the threshold value TH is only required to be determined on the basis of, for example, the false detection probability due to noise.

Figure 7B:
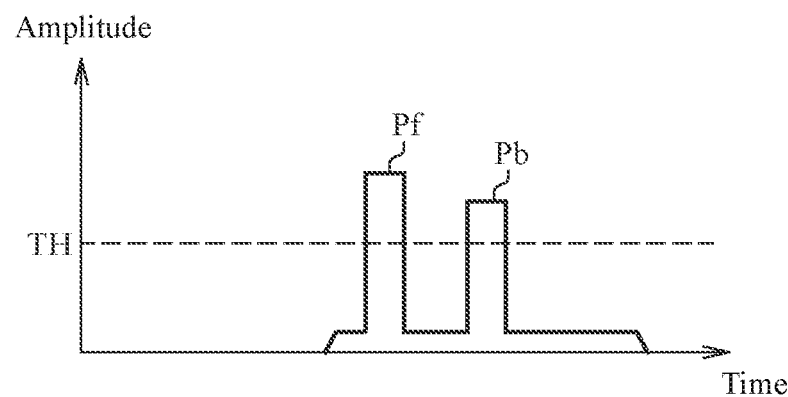

On the other hand, in a case where interference among signal waves occurs, as illustrated in the example of FIG. 7B, a situation may occur in which an output signal waveform Pf is caused by a signal wave, whereas an output signal waveform Pb is not caused by the signal waves. In a case where such a situation is assumed, the ToA calculating unit 44 may detect a false peak. Therefore, in order to prevent detection of false peaks, it is desirable that the ToA calculating unit 44 sets the threshold value on the basis of a peak other than a peak having the maximum amplitude among the plurality of peaks. In the case of FIG. 7B, the ToA calculating unit 44 can set the threshold value TH at a value that is less than the amplitude of the peak of the output signal waveform Pf (a peak having the maximum amplitude) among the peaks of the output signal waveforms Pf and Pb and exceeds the amplitude of the false peak of the output signal waveform Pb. As a result, false peak detection can be avoided.

However, in the example of FIG. 7B, if it is assumed that the output signal waveform Pb is caused by a signal wave and that the output signal waveform Pf is not caused by the signal waves, the ToA calculating unit 44 is only required to detect and use all the peaks appearing in the output signal waveform.

After step ST12 in FIG. 5, if not all of the synchronous transmission units $12_1, \ldots, 12_N$ have been selected (NO in step ST13), the ToA detecting unit 41 selects one synchronous transmission unit $12_n$ from the rest of the synchronous transmission units (step ST14). Then, step ST12 is executed.

Then, if all of the synchronous transmission units $12_1, \ldots, 12_N$ have been selected (YES in step ST13), the distance difference calculating unit 46 acquires the time of arrival detected by the ToA detecting unit 41 as described above and calculates distance differences based on the time of arrival difference for each synchronous transmission unit $12_n$ (step ST21). At this point, the distance difference calculating unit 46 supplies an observation vector, containing the distance differences that have been calculated as elements, to the positioning arithmetic unit 51.

The positioning arithmetic unit 51 executes a positioning arithmetic operation based on a nonlinear Kalman filter according to the procedure illustrated in FIG. 6 using the observation vector $z^s$ (k) (s=1,2, . . . ) supplied from the distance difference calculating unit 46 (steps ST31 to ST40). Hereinafter, an extended Kalman filter (EKF) will be described as an example of the nonlinear Kalman filter; however, it is not limited thereto.

Here, it is based on the premise that a motion model of the signal receiver Rx (mobile terminal 2), which is the target, is given by the following Equation 3.1 and that the observation model is given by the following Equation 3.2.

$$\Phi(k)=f(\Phi(k-1))+w(k-1) \tag{3.1}$$

$$z^s(k)=h(\Phi(k))+v(k) \tag{3.2}$$

Here, $\Phi(k)$ denotes a state vector of the target at time $t_k$, and f ( ) and h ( ) are each a nonlinear function vector. Term w (k−1) represents a system noise vector indicating the ambiguity of the motion velocity of the target, the average value of the system noise vector w (k−1) is 0, and the covariance matrix thereof is denoted by $Q_k$. Meanwhile, v (k) denotes an observation noise vector, the average value of the observation noise vector v (k) is 0, and the covariance matrix thereof is denoted by $R_k$.

The state vector $\Phi(k)$ of the target is a six-dimensional vector whose elements are, for example, the three-dimensional positional components x (k), y (k), and z (k) and velocity components dx (k)/dt, dy (k)/dt, and dz (k)/dt as expressed in the following Equation 4.

$$\Phi(k) = \left[x(k), y(k), z(k), \frac{dx(k)}{dt}, \frac{dy(k)}{dt}, \frac{dz(k)}{dt}\right]^T \tag{4}$$

Here, the superscript T is a symbol representing transposition.

For example, if the motion of the target is approximated by a constant velocity linear motion, Equation 3.1 can be expressed as the following Equation 5.

$$\Phi(k)=F_k \cdot \Phi(k-1)+w(k-1) \tag{5}$$

Value $F_k$ in Equation 5 can be represented by a matrix of six rows and six columns as expressed in the following Equation 6.

$$F_k = \begin{bmatrix} I_{3\times 3} & \tau_k I_{3\times 3} \\ 0 \cdot I_{3\times 3} & I_{3\times 3} \end{bmatrix} \tag{6}$$

Here, $\tau_k$ denotes the sampling interval ($=t_k-t_{k-1}$), and $I_{3\times 3}$ denotes a unit matrix of three rows and three columns.

The covariance matrix $Q_k$ of the system noise vector w (k) is as expressed in the following Equation 7 (q denotes the power spectral density of the system noise, which is a constant value).

$$Q_k = \begin{bmatrix} \frac{1}{3}\tau_k^3 I_{3\times 3} & \frac{1}{2}\tau_k^2 I_{3\times 3} \\ \frac{1}{2}\tau_k^2 I_{3\times 3} & \tau_k I_{3\times 3} \end{bmatrix} \times q \tag{7}$$

Here, let us assume that an estimation state vector indicating an estimated state of the target at past time $t_{k-1}$ is expressed as $\varphi^i$ (k−1|k−1) and that an estimation error covariance matrix corresponding thereto is expressed as $P^i$ (k−1|k−1). The superscript i is an integer greater than or equal to 1 indicating the number of the estimation state vector. Here, an i-th hypothesis $H^i$ (k−1|k−1) at the time $t_{k-1}$ is defined as the following Equation 8.

$$H^i(k-1|k-1)=\{c^i(k-1),\varphi^i(k-1|k-1),P^i(k-1|k-1)\} \tag{8}$$

Here, $c^i$ (k−1) is an evaluation value indicating the likelihood of the hypothesis $H^i$ (k−1|k−1). The hypothesis $H^i$ (k−1|k−1) in Equation 8 is a combination of the estimation state vector $\varphi i$ (k−1|k−1), the estimation error covariance matrix $P^i$ (k−1|k−1), and the evaluation value $c^i$ (k−1).

The hypothesis storage unit 65 stores the hypothesis $H^i$ (k−1|k−1) at the past time $t_{k-1}$ with respect to the current time $t_k$. Note that a hypothesis Hi (0|0) at time to is given as an initial parameter.

With reference to FIG. 6, in step ST31, the track prediction unit 66 acquires the hypothesis $H^i$ (k−1|k−1) at the time $t_{k-1}$ from the hypothesis storage unit 65. Next, the track prediction unit 66 calculates a prediction state vector (preliminary state estimation vector) $\varphi^i$ (k|k−1) and a prediction error covariance matrix $P^i$ (k|k−1) at the current time $t_k$ using the hypothesis $H^i$ (k−1|k−1) for all numbers i (step ST32).

Specifically, the track prediction unit 66 can calculate a prediction state vector $\varphi^i$ (k|k−1) as expressed in the following Equation 9.

$$\varphi^i(k|k-1)=f(\varphi^i(k-1|k-1)) \tag{9}$$

The track prediction unit 66 can also calculate a prediction error covariance matrix $P^i$ (k−1|k−1) as expressed in the following Equation 10.

$$P^i(k|k-1)=F_{k-1}\cdot P^i(k-1|k-1)\cdot F_{k-1}^T+Q_k \tag{10}$$

Value $F_{k-1}$ in Equation 10 is a partial differential matrix (Jacobian) as expressed in the following Equation 11.

$$F_{k-1} = \left.\frac{\partial f(\Phi(k))}{\partial \Phi}\right|_{\Phi(k)=\phi^i(k-1|k-1)} \tag{11}$$

After step ST32, the track prediction unit 66 generates a prediction hypothesis $H^i$ (k|k−1) as expressed in the following Equation 12 using the prediction state vector $\varphi^i$ (k|k−1) and the prediction error covariance matrix $P^i$ (k−1|k−1) calculated in step ST32 (step ST33).

$$H^i(k|k-1)=\{c^i(k-1),\phi^i(k|k-1),P^i(k|k-1)\} \tag{12}$$

The prediction hypothesis $H^i$ (k|k−1) in Equation 12 is a combination of the prediction state vector $\varphi^i$ (k|k−1), the prediction error covariance matrix $P^i$ (k|k−1), and the evaluation value $c^i$ (k−1). Next, the correlation hypothesis generating unit 61 calculates two types of correlation hypotheses $M^{(i,s)}$(k|k−1) and $M^{(i,0)}$(k|k−1) as expressed in the following Equations 13.1 and 13.2 using the observation vector $z^s$ (k) and the prediction hypothesis $H^i$ (k|k−1) (step ST34).

$$M^{(i,s)}(k|k-1)=\{c^i(k-1),\phi^i(k|k-1),P^i(k|k-1),z^s(k)\} \tag{13.1}$$

$$M^{(i,0)}(k|k-1)=\{c^i(k-1),\phi^i(k|k-1),P^i(k|k-1),z^0(k)\} \tag{13.2}$$

Here, $z^0$ (k) is a sign indicating for convenience that the observation vector $z^s$(k) (s=1,2, . . . ) is not assigned. The correlation hypothesis $M^{(i,s)}$ (k|k−1) in Equation 13.1 is a combination of the prediction state vector $\varphi^i$ (k|k−1), the prediction error covariance matrix $P^i$ (k|k−1), the evaluation value $c^i$ (k−1), and an assigned observation vector $z^s$ (k), and the correlation hypothesis $M^{(i,0)}$ (k|k−1) in Equation 13.2 is a combination of the prediction state vector $\varphi^i$ (k|k−1), the prediction error covariance matrix $P^i$ (k|k−1), the evaluation value $c^i$ (k−1), and the sign $z^0$ (k).

Next, the correlation hypothesis evaluating unit 62 calculates new evaluation values $c^i$ (k) and $d^i$ (k) of the correlation hypotheses $M^{(i,s)}$(k|k−1) and $M^{(i,0)}$(k|k−1) for all combinations of (i, s) and updates the correlation hypotheses $M^{(i,s)}$(k|k−1) and $M^{(i,0)}$(k|k−1) (step ST35).

Specifically, for example, new evaluation values $c^i$ (k) and $d^i$ (k) can be calculated on the basis of the following Equations 14.1 and 14.2.

$$c^i(k)=c^i(k-1)\times g^i(k)\times p_D \tag{14.1}$$

$$d^i(k)=c^i(k-1)\times \beta_{FT}\times(1-p_D) \tag{14.2}$$

Here, $g^i$ (k) is the likelihood of a track, $p_D$ is a detection probability, and OFT is a preset false detection occurrence rate.

The updated correlation hypotheses $N^{(i,s)}$ (k|k−1) and $N^{(i,0)}$ (k|k−1) are expressed by the following Equations 15.1 and 15.2.

$$N^{(i,s)}(k|k-1)=\{c^i(k),\phi^i(k|k-1),P^i(k|k-1),z^s(k)\} \tag{15.1}$$

$$N^{(i,0)}(k|k-1)=\{d^i(k),\phi^i(k|k-1),P^i(k|k-1),z^0(k)\} \tag{15.2}$$

Here, the updated correlation hypothesis $N^{(i,s)}$ (k|k−1) is a combination of the prediction state vector $\varphi^i$ (k|k−1), the prediction error covariance matrix $P^i$ (k|k−1), the assigned observation vector $z^s$ (k), and the updated evaluation value $c^i$ (k), and the updated correlation hypothesis $N^{(i,0)}$ (k|k−1) is a combination of the prediction state vector $\varphi^i$ (k|k−1), the prediction error covariance matrix $P^i$ (k|k−1), the sign $z^0$ (k), and the updated evaluation value d (k).

Next, the hypothesis update unit 63 calculates the estimation state vectors $\varphi^{(i,s)}$ (k|k) and $\varphi^{(i,0)}$ (k|k) and the estimation error covariance matrices $P^{(i,s)}$ (k|k) and $P^{(i,0)}$ (k|k) at the current time $t_k$ using the updated correlation hypotheses $N^{(i,s)}$ (k|k−1) and $N^{(i,0)}$ (k|k−1) for all the combinations of (i, s) (step ST36).

Specifically, the estimation state vectors $\varphi^{(i,s)}$ (k|k) and $\varphi^{(i,0)}$ (k|k) can be calculated on the basis of the following Equations 16.1 and 16.2.

$$\phi^{(i,s)}(k|k)=\phi^i(k|k-1)+K_k^i[z^s(k)-h(\phi^i(k|k-1))] \quad (16.1)$$

$$\phi^{(i,0)}(k|k)=\phi^i(k|k-1) \quad (16.2)$$

Here, $K_k^j$ is an extended Kalman gain matrix, and $H_k$ is a partial differential matrix (Jacobian). The extended Kalman gain matrix $K_k^j$ is expressed by the following Equation 17.

$$K_k^i=P^i(k|k-1)H_k^T[H_k P^i(k|k-1)H_k^T+R_k]^{-1} \quad (17)$$

The partial differential matrix $H_k$ is expressed by the following Equation 18.

$$H_k = \left.\frac{\partial h(\Phi(k))}{\partial \Phi}\right|_{\Phi(k)=\phi^i(k|k-1)} \quad (18)$$

Furthermore, the estimation error covariance matrices $P^{(i,s)}$ (k|k) and $P^{(i,0)}$ (k|k) can be calculated by the following Equations 19.1 and 19.2.

$$P^{(i,s)}(k|k)=P^i(k|k-1)-K_k^i H_k P^i(k|k-1) \quad (19.1)$$

$$P^{(i,0)}(k|k)=P^i(k|k-1) \quad (19.2)$$

After step ST36, the hypothesis update unit 63 calculates hypothesis candidates $H^{(i,s)}$ (k|k) and $H^{(i,0)}$ (k|k) at the current time $t_k$ as expressed in the following Equations 20.1 and 20.2 using the estimation state vectors $\varphi^{(i,s)}$ (k|k) and $\varphi^{(i,0)}$ (k|k) and the estimation error covariance matrices $P^{(i,s)}$ (k|k) and $P^{(i,0)}$ (k|k) calculated in step ST36 (step ST37).

$$H^{(i,s)}(k|k)=\{c^i(k),\phi^{(i,s)}(k|k),P^{(i,s)}(k|k)\} \quad (20.1)$$

$$H^{(i,0)}(k|k)=\{d^i(k),\phi^{(i,0)}(k|k),P^{(i,0)}(k|k)\} \quad (20.2)$$

Here, the hypothesis candidate $H^{(i,s)}$ (k|k) is a combination of the estimation state vector $\varphi^{(i,s)}$ (k|k), the estimation error covariance matrix $P^{(i,s)}$ (k|k), and the evaluation value $c^i$ (k), and the hypothesis candidate $H^{(i,0)}$ (k|k) is a combination of the estimation state vector $\varphi^{(i,0)}$ (k|k), the estimation error covariance matrix $P^{(i,0)}$ (k|k), and the evaluation value $d^i$ (k).

After step ST37, the hypothesis selection unit 64 selects at least one hypothesis candidate having a relatively high evaluation value from among the hypothesis candidates $H^{(i,s)}$ (k|k) and $H^{(i,0)}$ (k|k) at the current time $t_k$ (step ST39) and stores the hypothesis candidate that has been selected in the hypothesis storage unit 65 as a hypothesis $H^i$ (k|k) at the time $t_k$ (step ST39). Here, the superscript i of the hypothesis $H^i$ (k|k) is a reassigned (renumbered) number, which is an integer greater than or equal to 1.

Meanwhile, the track determination unit 68 determines a track of a hypothesis candidate (estimation state vector) having the highest evaluation value as the track at the current time $t_k$ among the hypothesis candidates $H^{(i,s)}$ (k|k) and $H^{(i,0)}$ (k|k) at the current time $t_k$ that have been generated in step ST37 (step ST40). The data of the track (track data) that has been determined is output to the outside.

After step ST40, the positioning arithmetic unit 51 determines whether or not to continue the positioning arithmetic operation (step ST41), and if it is determined to continue the positioning arithmetic operation (YES in step ST41), the time number k is incremented (step ST42), and the positioning process is returned to step ST11 in FIG. 5. On the other hand, if it is determined that the positioning arithmetic operation is not continued (NO in step ST41), the positioning arithmetic unit 51 ends the positioning process.

Figure 8:
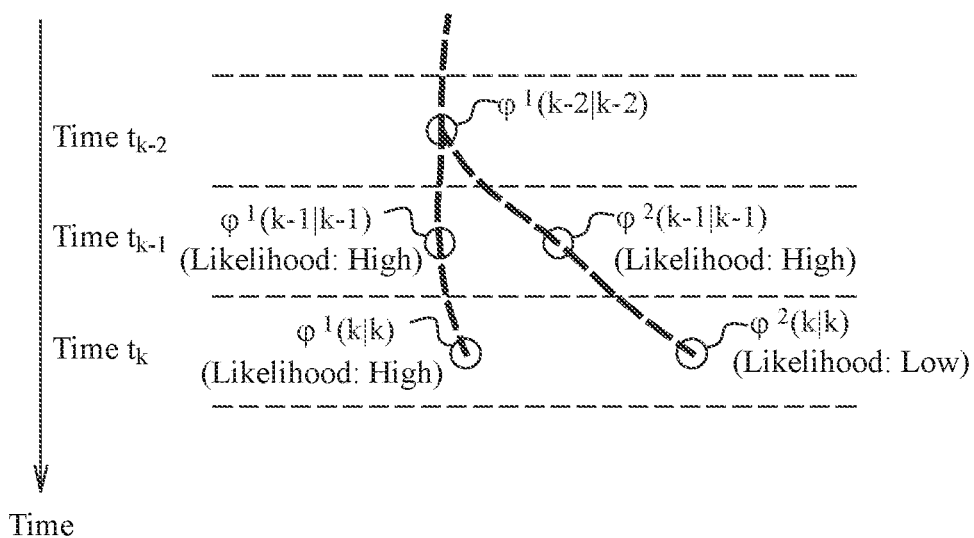
FIG. 8 is a diagram illustrating an example of transition of a track (estimation state vector) of a mobile terminal.

As described above, according to the first embodiment, the positioning arithmetic unit 51 can calculate the estimation state vector $\varphi^i$ (k|k) indicating the position information of a target by executing the positioning arithmetic operation based on a nonlinear Kalman filter using the observation vector $z^s$ (k) and known position information of the signal transmitters $Tx_{n,1}$ to $Tx_{n,M}$, and thus highly accurate position information can be measured even in the positioning space IS where no GNSSs can be used. FIG. 8 is a diagram illustrating an example of transition of a track (estimation state vector) of a target. As illustrated in FIG. 8, even when a track $\varphi^1$ (k−2|k−2) at time $t_{k-2}$ branches into a plurality of tracks $\varphi^1$ (k−1|k−1) and $\varphi^2$ (k−1|k−1) at the time $t_{k-1}$, since an evaluation value of a correlation hypothesis is an accumulation of a likelihood at each time, it is expected that an evaluation value of a correlation hypothesis including likely tracks gradually increase. Therefore, as illustrated in FIG. 8, even when the track $\varphi^1$ (k−1|k−1) is generated on the basis of the true peak, whereas the track $\varphi^2$ (k−1|k−1) is generated on the basis of a false peak, at the time $t_k$, the hypothesis selection unit 64 can select a track $\varphi^1$ (k|k) having a high likelihood without selecting a track $\varphi^2$ (k|k) having a low likelihood. Therefore, in the present embodiment, the position estimation performance with respect to a target is improved as compared with the related technology.

Furthermore, in the present embodiment, since a server that provides auxiliary information as disclosed in Patent Literature 1 is not required, it is possible to keep the configuration cost of the positioning system low. Furthermore, since the distance difference calculating unit 46 calculates an observation vector indicating a set of distance differences for each synchronous transmission unit $12_n$, and the positioning arithmetic unit 51 executes a positioning arithmetic operation based on the nonlinear Kalman filter using the observation vector, it is possible to calculate the estimation state vector $\varphi^i$ (k|k) with high accuracy even when time synchronization is not performed among the synchronous transmission units $12_1, \ldots, 12_N$. Therefore, since the cost required for time synchronization among the synchronous transmission units $12_1, \ldots, 12_N$ can be reduced, it is possible to keep the configuration cost of the positioning system low.

Second Embodiment

Figure 9:
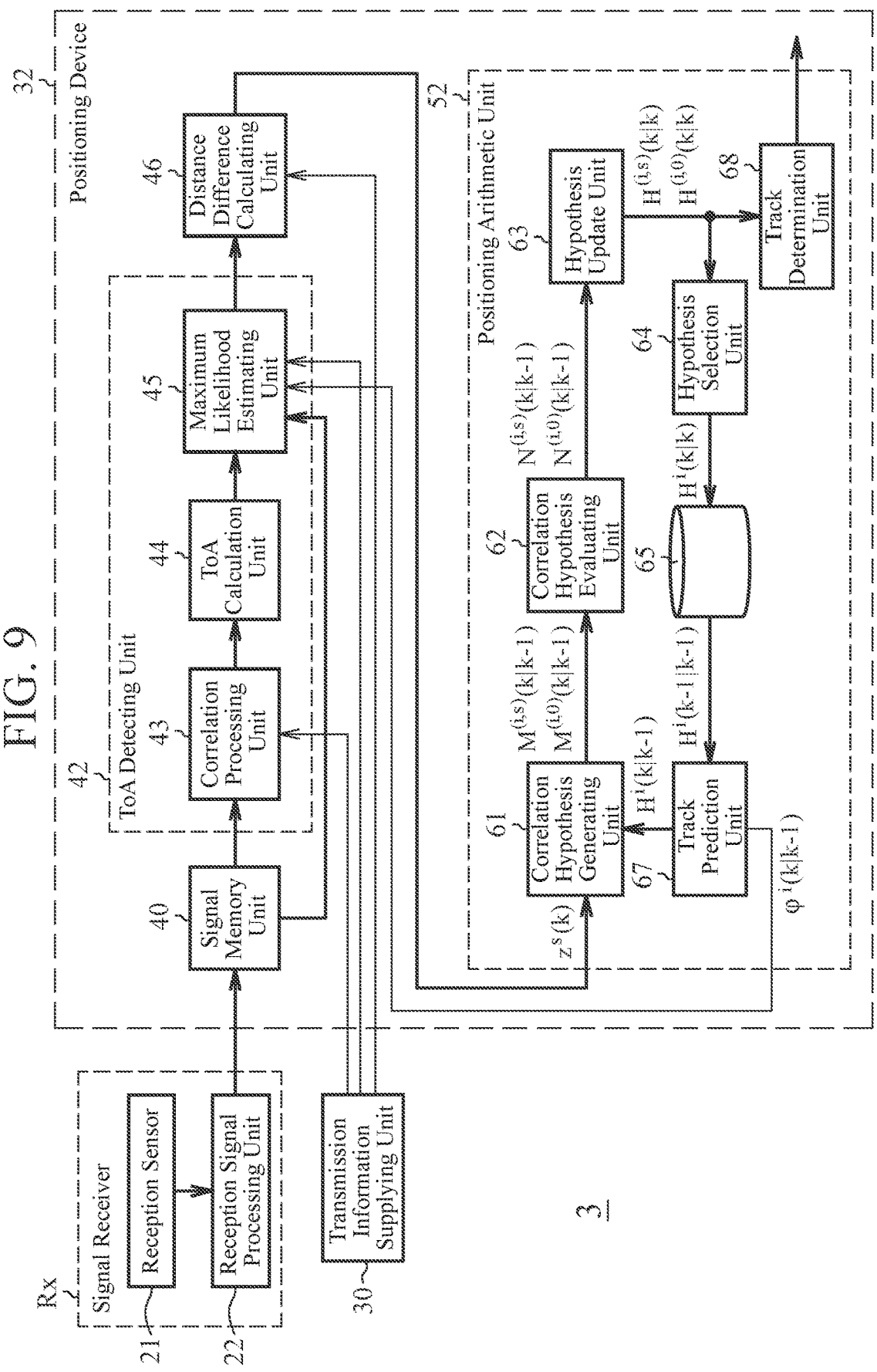
FIG. 9 is a functional block diagram illustrating a schematic configuration of a positioning device according to a second embodiment of the present invention.

Next, a second embodiment of the present invention will be described. FIG. 9 is a functional block diagram illustrating a schematic configuration of a mobile terminal 3 according to the second embodiment of the present invention. As illustrated in FIG. 9, the mobile terminal 3 includes a signal receiver Rx, a transmission information supplying unit 30, and a positioning device 32, and the positioning device 32 includes a signal memory unit 40, a time of arrival (ToA) detecting unit 42, a distance difference calculating unit 46, and a positioning arithmetic unit (tracking processing unit) 52. The configuration of the positioning system of the present embodiment is the same as the configuration of the positioning system of the first embodiment except that the ToA detecting unit 42 of FIG. 9 is included in place of the ToA detecting unit 41 of FIG. 3 and that the track prediction unit 67 of FIG. 9 is included instead of the track prediction unit 66 of FIG. 3. Note that, as the mobile terminal 3, for example, a mobile communication terminal such as a smartphone or a digital communication device such as a tablet terminal can be used.

The ToA detecting unit 42 of the present embodiment includes a correlation processing unit 43, a ToA calculating unit 44, and a maximum likelihood estimating unit 45. The maximum likelihood estimating unit 45 has a function of estimating the time of arrival of each of a plurality of signal waves by executing a process based on the maximum likelihood estimation method (maximum likelihood estimating process) for each synchronous transmission unit $12_n$. In a case where the influence of interference among signal waves is not negligible, there are cases where the ToA calculating unit 44 calculates time of arrival with low accuracy or cannot calculate time of arrival required to obtain an observation vector $z^i$ (k). Even in such a case, the maximum likelihood estimating unit 45 can calculate the maximum likelihood estimation value of the time of arrival.

The track prediction unit 67 of the present embodiment has the same function as the track prediction unit 66 of the first embodiment and further has a function of calculating the prediction state vector $\varphi^i$ (k|k−1) of a target (signal receiver Rx) at the current time $t_k$ before the positioning arithmetic operation is executed. The maximum likelihood estimating unit 45 can execute the maximum likelihood estimating process using a predicted position included in the prediction state vector $\varphi^i$ (k|k−1).

Figure 10:
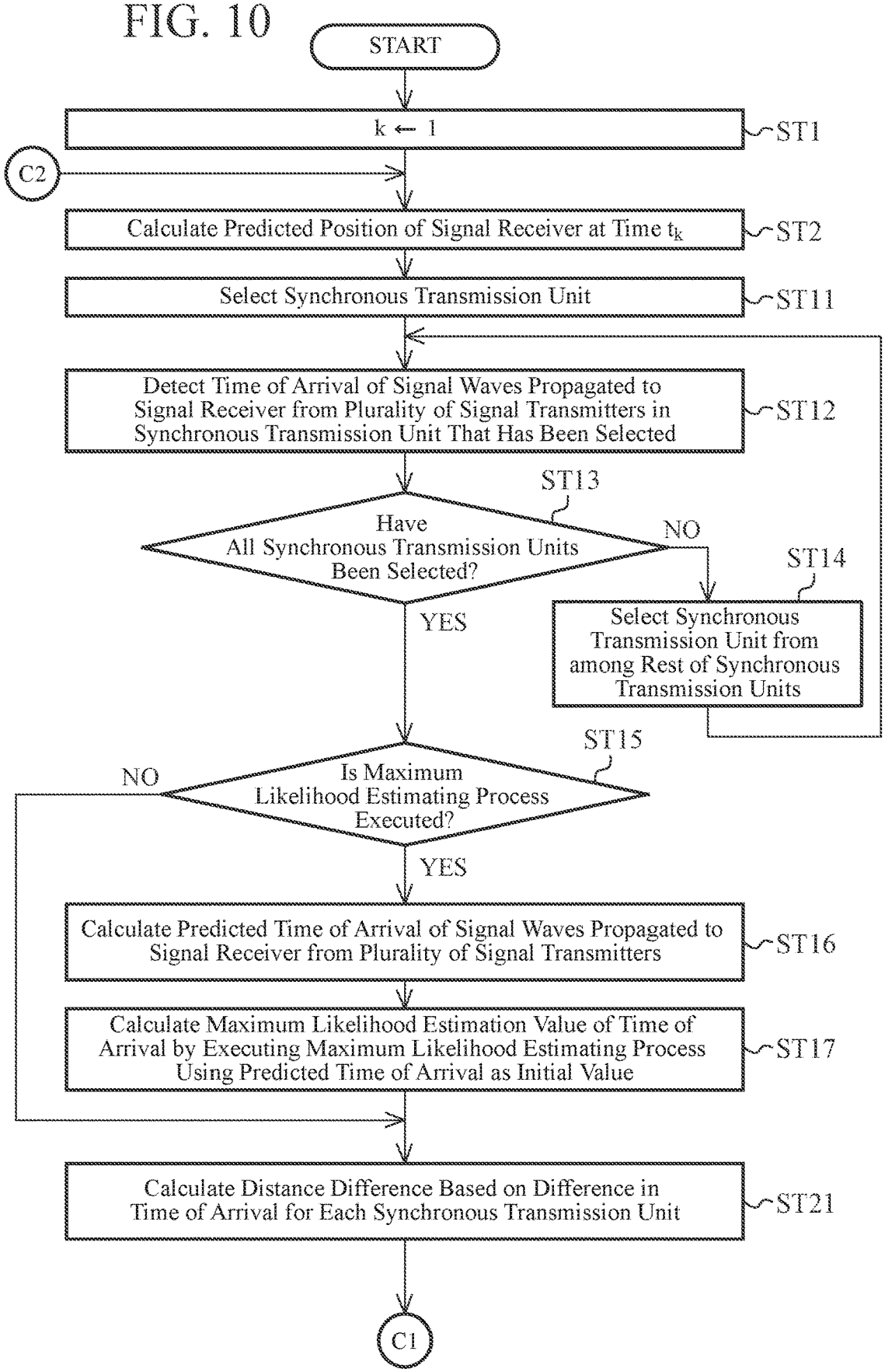
FIG. 10 is a flowchart schematically illustrating an exemplary procedure of positioning processing according to the second embodiment.

The operation of the positioning device 32 of the second embodiment will be described with reference to FIG. 10. FIG. 10 is a flowchart schematically illustrating an exemplary procedure of positioning processing according to the second embodiment. The flowchart illustrated in FIG. 10 is connected to the flowchart illustrated in FIG. 6 via the connectors C1 and C2.

With reference to FIG. 10, after step ST1, the track prediction unit 67 calculates the prediction state vector $\varphi^i$ (k|k−1) of the target (signal receiver Rx) at the current time $t_k$ and supplies the prediction state vector $\varphi^i$ (k|k−1) to the maximum likelihood estimating unit 45 (step ST2).

Thereafter, the ToA detecting unit 42 executes steps ST11 to ST14 in a similar manner to the case of the first embodiment (FIG. 5). Then, the maximum likelihood estimating unit 45 determines whether or not to execute the maximum likelihood estimating process (step ST15). For example, if the accuracy of time of arrival calculated by the ToA calculating unit 44 is low, or if the time of arrival required to obtain the observation vector $z^i$ (k) is not calculated, the maximum likelihood estimating unit 45 is only required to execute the maximum likelihood estimating process (steps ST16 to ST17). If it is determined that no maximum likelihood estimating process is executed (NO in step ST15), step ST21 is executed in a similar manner to the case of the first embodiment (FIG. 5).

If it is determined that the maximum likelihood estimating process is executed (YES in step ST15), the maximum likelihood estimating unit 45 acquires known position information of the signal transmitters $Tx_{1, 1}$ to $Tx_{1, M}$, ..., $Tx_{N, 1}$ to $Tx_{N, M}$ from the transmission information supplying unit 30 and calculates predicted time of arrival $T_{p, 1}$, $T_{p, 2}$, ..., $T_{p, I}$ of the respective signal waves propagated from the signal transmitters $Tx_{1, 1}$ to $Tx_{1, M}$, ..., $Tx_{N, 1}$ to $Tx_{N, M}$ to the signal receiver Rx using the known position information and the predicted position of the signal receiver Rx calculated in step ST2 (step ST14). Here, I is a positive integer indicating the number pieces of time of arrival to be predicted.

Next, the maximum likelihood estimating unit 45 acquires a reception signal from the signal memory unit 40 and a reference signal from the transmission information supplying unit 30 and calculates a maximum likelihood estimation value of time of arrival by executing the maximum likelihood estimating process, in which the predicted time of arrival $T_{p, 1}$, $T_{p, 2}$, ..., $T_{p, I}$ is the initial value, using the reception signal and the reference signal (step ST17). Then, the distance difference calculating unit 46 calculates distance differences based on the maximum likelihood estimation value of the time of arrival (step ST21). Thereafter, step ST31 is executed in a similar manner to the case of the first embodiment (FIG. 6).

In step ST17, the maximum likelihood estimating unit 45 is only required to calculate a maximum likelihood estimation amount $\langle t_{ToA} \rangle$ of a time of arrival vector that maximizes the likelihood function $\Omega$ ($t_{ToA}$) related to the time of arrival vector $t_{ToA}$ as expressed in the following Equation 21 by executing a repetitive calculation based on a known maximum likelihood estimation algorithm such as the steepest descent method, the Newton-Raphson method, or the Broyden-Fletcher-Goldfarb-Shanno algorithm (BFGS method).

$$\langle t_{ToA} \rangle = \arg\max_{t_{ToA}} \Omega(t_{ToA}) \qquad (21)$$

The time of arrival vector $t_{ToA}$ in Equation 21 is expressed by the following Equation 22.

$$t_{ToA} = [T_1, T_2, \ldots, T_I] \qquad (22)$$

Here, $T_1$, $T_2$, ..., $T_I$ are variables of the time of arrival that correspond to predicted time of arrival $T_{p, 1}$, $T_{p, 2}$, ..., $T_{p, I}$, respectively.

For example, a likelihood function $\Omega$ ($t_{ToA}$) as expressed in the following Equation 23 can be used.

$$\Omega(t_{ToA}) = \frac{1}{(\pi\sigma^2)^L} \exp\left\{-\frac{1}{\sigma^2}(w - A(t_{ToA}) \cdot S)^H (w - A(t_{ToA}) \cdot S)\right\} \qquad (23)$$

Here, $\sigma^2$ denotes the dispersion of noise power, L denotes the number of samples of the reception signal acquired from the signal memory unit 40, w denotes a vector of L rows and 1 column having the sample values of the reception signal as elements, A ($t_{ToA}$) denotes a matrix, S denotes a vector, and a superscript H is a symbol representing an Hermitian conjugate.

The matrix A ($t_{ToA}$) of Equation 23 is, for example, expressed by the following Equation 24.

$$A(t_{ToA}) = [r_1(T_1), r_2(T_2), \ldots, r_I(T_I)]^T \qquad (24)$$

Here, $r_1$ ($T_1$), ..., and $r_I$ ($T_I$) are vectors obtained by sampling L sample values from each of I reference signals. The matrix A ($t_{ToA}$) has L rows and I columns.

Moreover, for example, the vector S in Equation 23 is expressed by the following Equation 25 when the amplitude and the initial phase of an i-th reference signal are denoted as $a_i$ and $\eta_i$, respectively.

$$S = [a_1 e^{j\eta_1}, a_2 e^{j\eta_2}, \ldots, a_L e^{j\eta_L}]^T \qquad (25)$$

As described above, according to the second embodiment, even when the ToA calculating unit 44 calculates time of arrival with low accuracy or when time of arrival that is required for obtaining the observation vector $z^i$ (k) cannot be calculated, the maximum likelihood estimating unit 45 can calculate the maximum likelihood estimation value of the time of arrival. This makes it possible to provide a highly reliable positioning system.

Furthermore, in the present embodiment, the maximum likelihood estimating unit 45 executes the maximum likelihood estimating process using the predicted time of arrival $T_{p,1}, T_{p,2}, \ldots, T_{p,I}$ as initial values (step ST17), the time required for the search for the time of arrival can be shortened, and the calculation amount of the maximum likelihood estimating process can also be reduced.

Note that, in order to reduce the possibility that the search result will be a local solution when the predicted time of arrival $T_{p,1}, T_{p,2}, \ldots, T_{p,I}$ is used as the initial values, the maximum likelihood estimating unit 45 may sample, a plurality of times, a sampling value from I normal distributions in which the predicted time of arrival $T_{p,1}, T_{p,2}, \ldots, T_{p,1}$ are used as the average value and execute the maximum likelihood estimating process in which the sample values are used as the initial values.

Furthermore, all or some of the functions of the positioning device 32 described above can be implemented by a single or a plurality of processors including a semiconductor integrated circuit such as a DSP, an ASIC, or an FPGA. Alternatively, all or some of the functions of the positioning device 32 may be implemented by a single or a plurality of processors including an arithmetic device such as a CPU or a GPU that executes program codes of software or firmware. Further alternatively, all or some of the functions of the positioning device 32 can be implemented by a single or a plurality of processors including a combination of a semiconductor integrated circuit such as a DSP, an ASIC, or an FPGA and an arithmetic device such as a CPU or a GPU. The hardware configuration of the positioning device 32 may be implemented by the signal processing circuit 70 illustrated in FIG. 4.

Although the first and second embodiments of the present invention have been described above with reference to the drawings, the first and second embodiments are examples of the present invention, and there may be various embodiments other than the first and second embodiments and modifications thereof. Within the scope of the present invention, the present invention may include a flexible combination of the first and second embodiments, a modification of any component of the embodiments, or omission of any component in the embodiments.

INDUSTRIAL APPLICABILITY

A positioning device, a mobile terminal, a positioning system, and a positioning method according to the present invention are capable of measuring highly accurate position information even in an environment where no GNSSs can be used and thus are suitable for use in a navigation system that uses positioning information of a mobile terminal in an indoor space or an underground space as well as in a hybrid positioning system that uses a combination of a plurality of types of positioning technology.

REFERENCE SIGNS LIST

IS: positioning space, 1: signal transmission system, 2, 3: mobile terminal, 11, $11_n$: transmission information supplying unit, $12_1, \ldots, 12_N$, $13_n$: synchronous transmission unit, $Tx_{1,1}$ to $Tx_{N,M}$: signal transmitter, 141, ..., $14_N$: time synchronization unit, Rx: signal receiver, 21: reception sensor, 22: reception signal processing unit, 30: transmission information supplying unit, 31, 32: positioning device, 32: positioning device, 40: signal memory unit, 41, 42: time of arrival (ToA) detecting unit, 43: correlation processing unit, 44: time of arrival (ToA) calculating unit, 45: maximum likelihood estimating unit, 46: distance difference calculating unit, 51, 52: positioning arithmetic unit (tracking processing unit), 61: correlation hypothesis generating unit, 62: correlation hypothesis evaluating unit, 63: hypothesis update unit, 64: hypothesis selection unit, 65: hypothesis storage unit, 66, 67: track prediction unit, 68: track determination unit, 70: signal processing circuit, 71: processor, 72: memory, 73: storage device, 74: input and output interface, 75: signal path

The invention claimed is:

1. A positioning device for operating in cooperation with a signal receiver for receiving a plurality of signal waves arriving from at least one synchronous transmitter comprising a plurality of signal transmitters that operates in synchronization with each other, the positioning device comprising:
   processing circuitry configured to
   detect time of arrival of each of the plurality of signal waves on a basis of a reception signal output from the signal receiver;
   calculate a difference in distance from the plurality of signal transmitters to the signal receiver as a set of observation values on a basis of a difference in the time of arrival that has been detected; and
   calculate an estimation state vector indicating position information of the signal receiver by executing a positioning arithmetic operation based on a nonlinear Kalman filter using an observation vector obtained by at least one transmission for each of the at least one the synchronous transmitter and indicating the set of the observation values and known position information of the plurality of signal transmitters.

2. The positioning device according to claim 1, wherein the at least one synchronous transmitter includes a plurality of synchronous transmitters,
   each of the plurality of synchronous transmitters includes M signal transmitters (M is an integer greater than or equal to 2), and
   the processing circuitry calculates the set of the observation values for each of the synchronous transmitters.

3. The positioning device according to claim 1, wherein the processing circuitry is further configured to execute a correlation process between the reception signal and a reference signal; and
   calculate, as the time of arrival, time that corresponds to a peak having an amplitude or power greater than or equal to a threshold value among a plurality of peaks appearing in an output signal to which the correlation processing is executed.

4. The positioning device according to claim 3, wherein the processing circuitry sets the threshold value on a basis of a peak other than the peak having a maximum amplitude among the plurality of peaks.

5. The positioning device according to claim 1, wherein the processing circuitry estimates time of arrival of each of the plurality of signal waves by executing a maximum likelihood estimating process.

6. The positioning device according to claim 1, wherein the processing circuitry estimates time of arrival of each of the plurality of signal waves by executing a maximum likelihood estimating process using predicted time of arrival of each of the plurality of signal waves.

7. The positioning device according to claim 1, wherein the processing circuitry calculates a plurality of candidates for the estimation state vector by executing a positioning arithmetic operation based on the nonlinear Kalman filter, calculates a plurality of evaluation values each indicating a likelihood of the plurality of candidates, and selects at least one candidate from among the plurality of candidates on a basis of the plurality of evaluation values.

8. The positioning device according to claim 1, wherein the plurality of signal waves is sound waves in a non-audible range.

9. A mobile terminal comprising the positioning device according to claim 1 and the signal receiver.

10. A positioning system comprising the at least one synchronous transmitter and a mobile terminal including the positioning device according to claim 1 and the signal receiver.

11. A positioning method executed in a positioning device for operating in cooperation with a signal receiver for receiving a plurality of signal waves arriving from at least one synchronous transmitter comprising a plurality of signal transmitters that operates in synchronization with each other, the positioning method comprising:

detecting time of arrival of each of the plurality of signal waves on a basis of a reception signal output from the signal receiver;

calculating a difference in distance from the plurality of signal transmitters to the signal receiver as a set of observation values on a basis of a difference in the time of arrival that has been detected; and calculating an estimation state vector indicating position information of the signal receiver by executing a positioning arithmetic operation based on a nonlinear Kalman filter using an observation vector obtained by at least one transmission for each of the at least one the synchronous transmitter and indicating the set of the observation values and known position information of the plurality of signal transmitters.

\* \* \* \* \*